United States Patent [19]

Puro

[11] Patent Number: 4,478,532
[45] Date of Patent: Oct. 23, 1984

[54] BOX JOINT EMPLOYING SCREW PIVOT PIN FOR ADJUSTABLE TIGHTENING

[75] Inventor: Nicholas S. Puro, Upper Saddle River, N.J.

[73] Assignee: Microdent Industries, No. Haledon, N.J.

[21] Appl. No.: 489,585

[22] Filed: Apr. 28, 1983

Related U.S. Application Data

[63] Continuation-in-part of Ser. No. 382,291, May 26, 1982.

[51] Int. Cl.³ .................. B25B 7/06; F16C 11/04
[52] U.S. Cl. ................................. 403/157; 403/158; 403/159; 403/162; 411/338; 16/342; 81/416; 30/155
[58] Field of Search ............... 403/157, 158, 159, 161, 403/162; 411/338, 339, 301, 302, 368, 369, 542; 16/DIG. 36, 273, 342, 386, 387; 81/416; 30/155, 160, 161

[56] References Cited

U.S. PATENT DOCUMENTS

| | | | |
|---|---|---|---|
| 1,069,209 | 8/1913 | Wambsgans | 16/273 X |
| 1,778,346 | 10/1930 | Zeidler | 411/368 X |
| 2,088,224 | 7/1937 | Aiken | 30/266 |
| 2,704,399 | 3/1955 | Melcher | 30/161 |
| 2,718,691 | 9/1955 | Sussenbach | 411/369 X |
| 2,939,214 | 6/1960 | Anderson et al. | 30/266 |
| 3,029,697 | 4/1962 | Okner | 403/161 X |
| 3,289,296 | 12/1966 | Hedstrom et al. | 30/267 |
| 4,414,868 | 11/1983 | Puro | 81/416 |

Primary Examiner—Cornelius J. Husar
Assistant Examiner—Joseph A. Fischetti
Attorney, Agent, or Firm—Ralph R. Roberts

[57] ABSTRACT

This invention pertains to an improvement in box joint tools and particularly for reducing play resulting from wear of the members forming the box joint. The box joint is formed in the usual manner. This improved joint is used when or where wear develops or may be utilized with new tools at the time of assembly. A first portion outer member of the box joint is machined to provide a counterbore and an enlarged bore in this member portion. A counterbore is also formed in the second outer member portion and extends to about one thirty second of an inch from a central jaw tongue portion. This counterbore provides a flexure portion with a smaller bore axially coincidental with the axis of the central portion. A pivot pin bushing has a threaded bore and is sized to be a press fit in the formed counterbore and enlarged bore of the first outer member. This bushing is mounted in the first outer member and the shank portion extends into the tongue portion of the central jaw. This extending portion of the bushing provides the pivot for this jaw portion. A securing screw is mounted in the second outer member and is tightened in the threaded portion of the bushing to bring the member portions of the box joint into a sliding relationship absent unwanted play. The box joint is shown in certain embodiments with a thin washer under the head of the cap screw. This washer is of metal or of plastic such as Teflon.

20 Claims, 9 Drawing Figures

BOX JOINT EMPLOYING SCREW PIVOT PIN FOR ADJUSTABLE TIGHTENING

This is a continuation-in-part of Applicant's application Ser. No. 382,291 filed May 26, 1982 with the same title. With the acceptance of this continuation-in-part the above identified application is expressly abandoned.

BACKGROUND OF THE INVENTION

This invention pertains to improvements in box joints for pivoted tools and particularly for screw pivot means and apparatus.

DESCRIPTION OF THE PRIOR ART

A pre-Ex search of the pertinent domestic and foreign patents was made in the United States Patent Office. The patents found show the use of a screw-type pivot directed to two-piece shear type tools. Particularly noted were adjustable pivot joints for shears or scissors. Class 30 was carefully reviewed as to subclasses 266 (joints and blade-tension means), and 267 (with friction-reducing feature). Among the patents considered to be pertinent are U.S. Pat. No. 889,966 as issued to RAUSCH, et al., on June 9, 1908. This patent shows two screw members disposed to maintain shear blade portions in an adjusted relationship with one another. This patent does not show or contemplate retaining a box joint in a tightened relationship. U.S. Pat. No. 2,088,224 to AIKEN as issued July 27, 1937 also uses two screws to provide a pivot pin with adjustable means and is particularly directed to two member pliers. This is a lap joint and not a box joint. U.S. Pat. No. 2,704,399 to MELCHER as issued Mar. 22, 1955 shows a two screw pivot for shears and is a modification of the above construction. U.S. Pat. No. 2,939,214 to ANDERSON, et al., as issued June 7, 1960 shows a screw and secured nut as used on diagonal wire cutters and U.S. Pat. No. 3,289,296 to HEDSTROM, et al., as issued Dec. 6, 1966 shows a screw and threaded insert for use in shears or snips. These patents do not disclose or suggest a box joint that has a pressure head or a plate washer disposed under the head of the adjusting screw and with that outer portion of the box joint counterbored sufficiently so that a flexure portion is adapted to be moved to cause the joint members to be tightened by the screw head.

SUMMARY OF THE INVENTION

This invention may be summarized, at least in part, with reference to its objects.

It is an object of this invention to provide, and it does provide, an adjustably tightened pivot pin for box joint tools such as cutters and pliers. These box joint tools have a central portion of the joint that is passed through a heated and expanded outer portion. These outer portions are heated and returned to their contiguous position with a smoothing of the facing surfaces. This is a difficult procedure and making this box joint with substantially little or no play is very difficult and expensive. Wear and/or play develops when used, thus reducing the efficiency of the box joint. This box joint has a counterbore under the screw head which is moved toward the midportion of the box joint and by manipulation of the screw tightness of the joint is restored.

It is a further object of this invention to provide, and it does provide, a box joint pivot pin that may be used with a new or used tool. This pivot includes a screw with a pan or countersunk head and is mated with a threaded pivot post that is mounted in a counterbored outer portion of the jaw. This head of the screw mates with a flexure portion or with a washer that provides a pressure plate that is moved inwardly by the screw head to bring the outer portions of the box joint into a snug sliding relationship with the central tongue member. This pivot post provides a positioning of the central tongue member with one outer portion of the joint. The other outer portion is counterbored and is moved toward the tongue central member. The shank of the screw provides the pivot of the screw head portion of the outer member. This pin provides a screw adjustment for bringing the outer portions of the box joint into a snug sliding relationship with a central member. This pivot pin provides a positioning of the central member with the outer portion of the joint.

In brief, this pivot pin is used for and with a box joint tool and includes a through bore with a countersink in both outer portions of the box joint. Mounted in one of the counterbored portions is a pivot bushing which extends from this counterbore and nearly through the central portion to within a few thousandths of an inch of the other exterior box joint portion. This counterbored exterior portion is sized to receive the head of the screw and rotate thereon. An antifriction washer is contemplated to be placed under the head of this screw. This adjustable pivot post is used in both new and used box joint tools. Immediately below this antifriction washer is a flexure portion which is moved by the screw head. This flexure portion extends to within about a thirty second of an inch or less of the central tongue portion. A screw head is mounted in the counterbore in the outer member and has a counterbore or countersink depending on the configuration of the head.

The present box joint construction requires that the central tongue portion of one of the pivoted members be finished on both outer sliding surfaces. The outer portions on the other jaw provide the inner facing surfaces also finished to provide sliding and compatible surface portions. This apertured portion of the tool is now heated sufficiently for the joint to be opened and the central portion of the other half is passed through. The outer portions of the joint are now caused to be brought into a contiguous relationship and a rivet is inserted as a pivot pin. This rivet provides the pivot and tightening of the joint. In conventional tools, shortly after use or wear, the joint may and usually develops excessive looseness that diminishes the effectiveness of the joint.

The improved box joint of this invention contemplates removal of existing rivets providing the pivot pin retention. A counterbore and through bore is formed in one outer portion of apertured jaw. This through bore is also formed in the central tongue portion of the box joint. The other outer portion is counterbored to within about one thirty-second of an inch and into this counterbore a screw head enters or a pressure washer may be mounted. When a pressure washer is used it is formed with a recess disposed to receive and retain the head of a securing screw. A very thin washer may be placed under the screw head to assist in reducing rotational drag during tightening of the joint. The enlarged head of the screw, or this screw may be combined with a pressure washer, insures that the flexure portion of the box joint and central tongue is movable and tightening of the joint is achieved.

In addition to the above summary the following disclosure is detailed to insure adequacy and aid in understanding of the invention. This disclosure, however, is not intended to cover each new inventive concept no aatter how it may later be disguised by variations in form or additions of further improvements. For this reason there has been chosen specific embodiments of the improved box joint employing a screw-type pivot pin as adopted for use in maintaining a tightness in the joint and showing a preferred means for constructing said pivot. This specific embodiment has been chosen for the purposes of illustration and description as shown in the accompanying drawing wherein:

BRIEF DESCRIPTION OF THE DRAWING

In the following description and in the claims various details are identified by specific names for convenience. These names are intended to be generic in their application. Corresponding reference characters refer to like members throughout the several figures of the drawing.

EMBODIMENT OF FIG. 1

Figure 1:
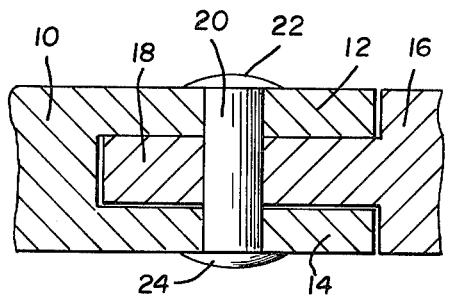
FIG. 1 represents a sectional side view, partly diagrammatic, and showing a typical box joint with the pivot pin rivet with slightly protruding heads or ends.

Referring next and now to the drawing and the box joint constructions shown therein, FIG. 1 is representative of the existing (Prior Art) box joint construction customarily provided. A jaw portion 10 has exterior portions 12 and 14 which mate with a jaw portion 16 having a midportion 18 that extends through the aperture between the exterior portion 12 and 14. These portions are brought together to provide a slidable and contiguous relationship of the box joint. A pivot is provided by a rivet 20 which as depicted has slightly enlarged and bulged ends 22 and 24. This is a typical construction, and after forming the enlarged ends 22 and 24, the pivot provided by the rivet 20 wears and excessive play occurs. With use and abuse the play in this box joint develops between portions 12, 14 and 16 and may be from ten to fifteen thousandths of an inch. Play or a looseness of five to ten thousandths of an inch is often not acceptable.

EMBODIMENT OF FIG. 2

Figure 2:
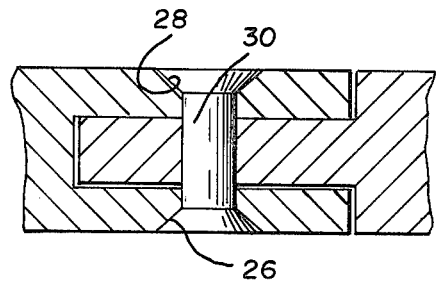
FIG. 2 represents a sectional side view, partly diagrammatic and showing the box joint of FIG. 1 but with the pin rivet formed with shallow countersunk head ends.

The box joint construction of FIG. 1 is noted but rather than a rivet with protruding and bulged ends this typical embodiment of FIG. 2 utilizes a flat rivet 30 that has no extending portion. The exterior portions 12 and 14 are formed with shallow countersinks 26 and 28 and a rivet 30 has the ends thereof swaged into the countersinks 26 and 28 in the outer portions 12 and 14. This rivet end is often polished so that this rivet and particularly the countersink ends are not appreciably visable.

EMBODIMENT OF FIG. 3

Figure 3:
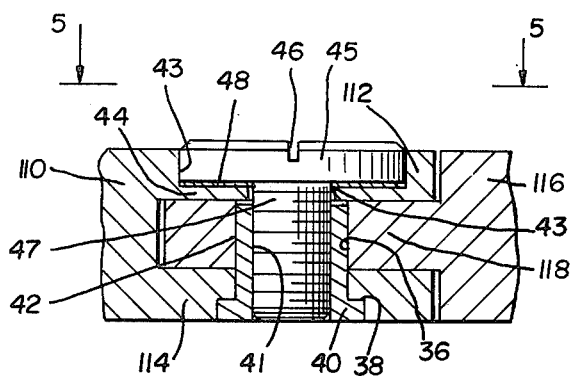
FIG. 3 represents a sectional side view, partly diagrammatic, and showing a box joint modified to accept a threaded post with a pan head screw mounted in a counterbore.

The embodiment of FIG. 3 contemplates Applicant's box joint formed with a rivet as shown in FIGS. 1 and 2. When this occurs the rivet is drilled out and a through hole 36 greater in diameter than the hole for the rivet and is formed through the exterior members 112 and 114 of the jaw portion 110 and central tongue portion 118 of jaw 116 is also drilled oversize to the diameter of hole 36. A counterbore 38 is formed in the exterior member 114 as depicted in FIG. 3. A pivot bushing 40 having interior threads 41 is a press fit in the counterbore and that portion of hole 36 formed in the exterior member 114. The tongue portion 118 is drilled or bored to provide a rotating fit with the shank of busing 40. A cap screw 45 is mounted in the threads 41 of pivot bushing 40. Exterior portion 112 is counterbored at 43 to within about one thirty second of an inch or less to produce a thin flexure portion 44 in this exterior portion. A special cap screw 45 having an enlarged head portion and a screw driver slot 46 is mounted in this counterbore 43. The shank 47 of this screw provides the pivot means for the portion 112. The threaded portion of this screw enters and engages the threads 41 of the pivot pin bushing 40. An antifriction washer 48 may be provided so as to reduce rotating friction. This washer may be of metal or of a plastic such as Teflon. The shank of the pivot bushing 40 is deliberately made a little short (about ten to twenty thousandths of an inch) so that when tightened the contiguous surfaces of the box joint slide by each other without play or looseness. It is to be noted that the pivot bushing provides a rotating fit with the outer diameter of the shank of the pivot bushing 40 and the bore in central tongue portion 118.

EMBODIMENT OF FIG. 4

Figure 4:
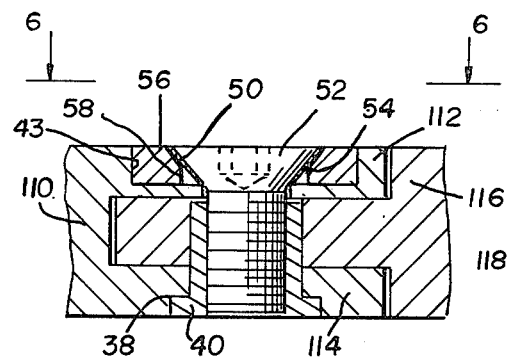
FIG. 4 represents a sectional side view, partly diagrammatic, and showing a box joint like that shown in FIG. 3 but with the screw a flat head mountable in a tapered countersink and using a pressure washer.

The embodiment of FIG. 4 is like that of FIG. 3 above described in that the pivot hole through both portions of the pivoted tool is bored to the larger diameters 38 and 43. The central portion 118 of the jaw portion 116 is as in FIG. 3 and the counterbore 38 is formed in the lower exterior member 114. The upper exterior member 112 is formed with a counterbore 43 like that in FIG. 3 and a tapered countersink 50 is adapted to receive a flat headed screw 52 which is seated in a pressure washer 56. This flat headed screw 52 may have a thin cone-shaped washer 54 underneath to assist in turning the pivot post. As in FIG. 3, the pivot bushing 40 is a press fit and is mounted in the counterbored portion 38 of lower exterior jaw portion 114. A Teflon (TM duPont) tapered washer 54 is placed under and against the taper of the flat headed screw 52.

In this embodiment there is additionally provided a pressure washer 56 that seats in the counterbore 43 formed in the upper exterior member 112. The flexure portion 44 is also the same as in FIG. 3. The head of screw 52 is conventionally eighty-two degrees and when used the thin washer 54 is of a like cone shape. The pressure washer 56 is formed with a countersink 50 of about seventy-five degrees and a clearance hole 58 is provided so that only the larger diameter of screw head of the screw 52 bears against the pressure washer 54 to move the flexure 44 toward the central tongue portion 118 and also to draw the box joint into a snug sliding fit.

EMBODIMENT OF FIG. 5

Figure 5:
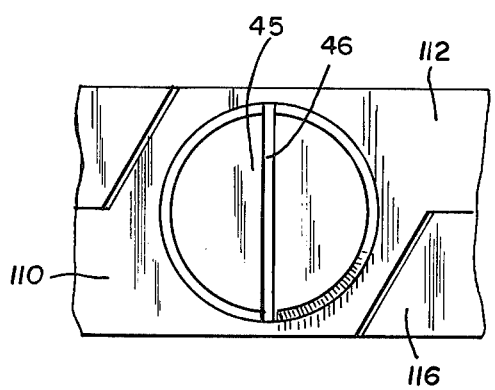
FIG. 5 represents a plan view, partly fragmentary and showing the assembled box joint of FIG. 3, this view taken on the line 5—5 thereof and looking in the direction of the arrows.

In FIG. 5 the plan view of the box joint of FIG. 3 is shown. As depicted, the cap screw 45 is shown with a screw driver slot 46 in its outer face but a Phillips slot or a socket headed screw may be provided. It is desired that the shank of this retaining screw 45 be a rotating or slide fit with bore 43 provided in the exterior upper portion 112. The central tongue portion 118 is also a slide and rotating fit around pivot bushing 40. When and as wear or play develops in the box joint the screw 45 is tightened in the threads 41 of the bushing 40. It is to be noted that this pivot bushing is a very tight retaining fit in the counterbored lower portion 114 but provides a close fit although with a rotary provision in the central portion 118. The shank 47 of the securing screw 45 provides the support for a rotary motion of the other exterior portion 112.

EMBODIMENT OF FIG. 6

Figure 6:
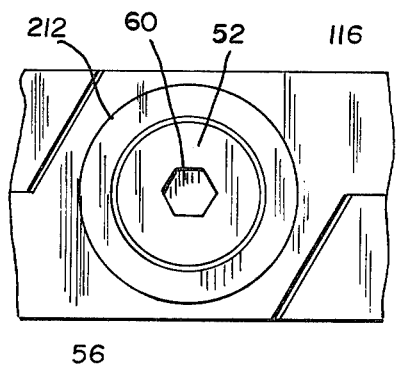
FIG. 6 represents a plan view, partly fragmentary and showing the assembled joint of FIG. 4, this view taken on the line 6—6 thereof and looking in the direction of the arrows.

Referring next to the embodiment of FIG. 6 the improved box joint as depicted in FIG. 4 is shown. Rather than a pan headed screw as in FIGS. 3 and 5 there is shown the flat headed screw 52 which is shown with a socket drive recess 60 and is used with the pivot pin bushing 40. Washer 54 may be provided to assist in the rotative actuation. This washer may be eliminated if desired as the adjustment by and with the screw is only infrequently required. Pivotal action of the jaws one to another occurs only on these sliding surfaces.

Figure 7:
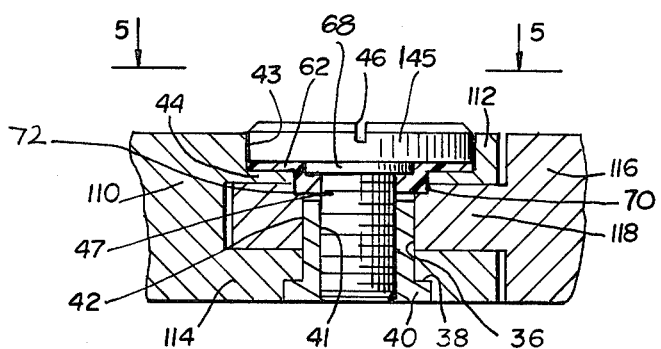
FIG. 7 represents a sectional side view, partly diagrammatic, and showing a box joint similar to that in FIG. 3 modified to accept and use a Teflon (TM DuPont) washer
Figure 8A:
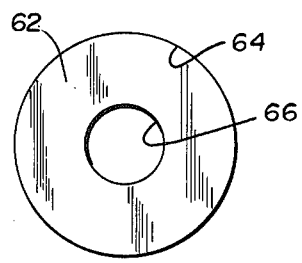
FIGS. 8A and 8B represent views of the Teflon washer used under the pan head screw and before cold flow of said washer as shown in FIG. 7.
Figure 8B:
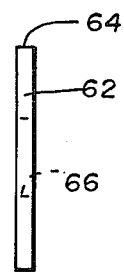

EMBODIMENT OF FIGS. 7, 8A and 8B

In FIGS. 7, 8A, and 8B is depicted the assembly of FIG. 3 but with a washer of plastic such as Teflon or Nylon which is easy and comparatively inexpensive to form and provide. This plastic material is low in friction and when placed under pressure provides a desired amount of "cold flow" or creep. As shown in these embodiments the pan head screw 145 is threaded into interior threads 41 of bushing 40. A flat washer 62 of Teflon or Mylon is shown with an outer and inner diameter 64 and 66 with the outer diameter a loose fit in the counterbore 43 and with the inner diameter a slip fit on the shank 47 of screw 145. In use the tightening of the pan head screw causes a cold flow of the Teflon or Nylon which results in a small portion flowing into the circular cavity above bushing 40 and under the head of screw 145. The properties of Teflon or Mylon provide an anit-friction sliding ability or means between the pan head screw and the thin flexure portion 44. The screw 145 has a shoulder portion 68 which is preferably integral and is disposed immediately below the head portion thereof. This shoulder 68 is great enough in diameter to cause deflection of the washer 62 with tightening of the screw 145 to cause this washer at its inner portion to cold flow toward bushing 40. Member 118 has a shallow counterbore 70 formed therein which is preferably about the same diameter as diameter 72 formed in the thin flexure portion 44. Teflon is preferably used as the anti-friction washer when the tool is used in the dental or medical field and is sterilized by live steam. Teflon is not affected by the use of live steam and the tightening of screw 145 causes a sliding means to be provided by this washer 64.

USE AND OPERATION

The improved box joints of FIGS. 3, 4, 5, 6 and 7 anticipate that the tool has been prepared with the interior surfaces finished and the exterior jaw portions brought into a contiguous relationship with the central portion. Rather than a fixed rivet as in FIGS. 1 and 2 the lower exterior portion 114 is drilled and counterbored to provide a determined diameter and depth. The bore of the central tongue portion 118 is usually the same as smaller bore 36 formed in the lower exterior portion 114 and provides the desired slip or rotating fit of the central tongue portion 118 with the outer diameter of bushing 40. As a practical matter, that portion of the bushing that extends in and into the box joint and provides a desired fit where the supportive surface for the central tongue portion 118 is made with a slightly reduced diameter.

The bushing 40 is a press fit in the counterbored and bored portion of lower member portion 114. The threads 41 are shown as a through thread but the lower end of bushing 40 may be closed and the screw made accordingly. Whether a flat headed screw 52 as in FIGS. 4 and 6 or a pan headed cap screw 45 as in FIGS. 3, 5 and 7 is used, it is anticipated that the screw, when tightened in the bushing 40, brings the outer portions of the box joint to the desired tightness (usually to within about one or two thousandths of an inch). The pivot bushing 40, in a mounted condition, provides a space of about ten to twenty thousandths of an inch from its end to the inner face or surface of the flexure portion 44. The bushing is of metal such as stainless steel or bronze and may be plated if desired. A like plating may be provided on the screw which is usually commerical.

The enlarged pan headed cap screw is adapted to bear against and move the flexure portion 44 toward the central tongue portion 118. This screw still requires a thin flexure 44 portion to bring the improved box joint to the desired degree of snugness. Washer 48 under the pan headed cap screw 45 in FIG. 3 and the cone shaped washer 54 under the flat headed screw 52 in FIG. 4 may be of steel (probably stainless of a few thousandths of an inch in thickness), bronze, brass or Teflon. Whatever the composition, the washer is anticipated to not appreciably change its thickness after adjustment for tightening of the box joint. The indicated space between the central tongue member and the outer members of the box joint are reduced to a slide fit after this adjustment.

It is to be noted that the added washer 56 in FIG. 4 may be prevented from rotation by a pin or dog means which is conventional. It is to be noted that when and where the steel used in the box joint is heat treated the flexure portion may be about twenty to twenty-five thousandths of an inch in thickness. This flexure portion must not excessively strain the threads of the screw and bushing. The Teflon washer 62 in FIG. 7 utilizes the shoulder 68 under the head of screw 145 to cause cold flow of this washer into the recess 72 in exterior member 112 and into the shallow counterbore 70 in jaw tongue 118. This Teflon washer as now conformed provides a thrust washer as well as a radial bearing. The depth of the counterbore 70 is short of the upper extent of the bushing 40 so that cold flow is not precluded for adjustment for wear.

Terms such as "left", "right", "up", "down", "bottom", "top", "front", "back", "in", "out" and the like are applicable to the embodiments shown and described in conjunction with the drawing. These terms are merely for the purposes of description and do not necessarily apply to the position in which the improved box joint employing screw pivot pin for adjustable tightening may be constructed or used.

While particular embodiments of the box joint have been shown and described it is to be understood the invention is not limited thereto and protection is sought to the broadest extent the prior art allows.

What is claimed is:

1. An improved box joint for pliers and the like in which the jaw portions are pivotally retained and movable in a prescribed plane normal to a pivot pin, this box joint including:
   (a) a first jaw member that is characterized as having a central tongue portion with outwardly facing surfaces smoothly finished and parallel to the plane of movement;
   (b) a second jaw member with substantially like portions providing first and second outer members and forming the outer sides of a box-like aperture in said second jaw member and with the facing inner surfaces of the aperture finished, and in the assembled condition the outer facing surfaces of the central tongue portion of the first jaw member are in a sliding relationship with the facing inner aperture surfaces of the first and second outer members of the second jaw member;
   (c) a counterbore and a through bore both having a predetermined axis formed in said first outer member of the second jaw and with said counterbore and through bore transverse of the plane of movement of the jaw members;
   (d) a through bore formed in and through the central tongue portion of the first jaw member, said through bore in axial coincidence with the through bore in the first outer member of the second jaw member;
   (e) a pivot pin bushing having a first diameter adapted to be seated in the counterbore of the first outer member and a second reduced outer diameter shank portion sized to be a tight fit in the remaining through bore of this first outer member of the second jaw member and with said shank portion of said bushing entering into and nearly through the through bore in the portion of the first jaw and providing a pivot for said first jaw member, said pivot pin bushing having an axially threaded bore;
   (f) a counterbore formed in the second outer member of the second jaw member and extending a determined distance from the outer surface of the second member of the second jaw, and a smaller diameter bore in axial coincidence with said counterbore and extending through the remainder of the thickness of the second outer member, said counterbore extending toward the central tongue portion sufficiently to establish a thin flexure portion about one thirty-second of an inch in thickness and sufficiently defelectable for said flexure portion to be moved for tightening the box joint, and
   (g) a securing screw having a head adapted to seat and move the second outer member flexure portion toward the central tongue and with the shank of said screw providing the pivot portion immediately interior of the securing screw and in coincidence with the axis of said pivot pin bushing, the thread portion of said securing screw entering into the threaded portion of the pivot pin bushing and with manipulation the screw is tightened to bring the box joint members into the desired sliding relationship of one to another, said adjustment reducing and/or eliminating any developed and unwanted play of and in the joint.

2. An improved box joint as in claim 1 in which the pivot pin bushing has a slightly reduced outer diameter of that end portion that extends into the central tongue portion of the first jaw when and where the box joint is in the desired assembled condition and where the through bore in the first jaw member is the same or less than the through bore formed in the first outer member of the second jaw.

3. An improved box joint as in claim 2 in which the pivot pin bushing in a mounted condition terminates at least ten thousandths of an inch short of that surface of the tongue facing the second outer member of the second jaw.

4. An improved box joint as in claim 1 in which the counterbore in the second outer member of the second jaw member is sized so that a cap screw with a head having a planar bottom surface may be rotatably seated in said counterbore and that shank portion of the cap screw immediately under said head providing a pivot for the remaining portion of said second outer member, said cap screw having threads compatible with the threaded bore of the pivot pin bushing.

5. An improved box joint as in claim 4 in which the cap screw is a pan head screw and there is provided in said head means for engaging and turning said screw.

6. An improved box joint as in claim 4 in which there is additionally provided a substantially incompressible washer which is thin and is mounted under the head of the cap screw so as to reduce friction in the turning adjustment of the cap screw.

7. An improved box joint as in claim 4 in which there is additionally provided a thin washer of Teflon or the like, said washer mounted under the head of the cap screw so as to reduce friction in the turning adjustment of the cap screw and in the operation of the box joint.

8. An improved box joint as in claim 1 in which there is additionally provided a pressure washer adapted to be seated in the counterbore in the second outer member and in said pressure washer there is formed a countersink with a taper and the securing screw also has a taper with a greater included angle adapted to engage the outer portion of the countersink so as to exert a greater pressure on the exterior diameter of the countersink as and when the screw is tightened.

9. An improved box joint as in claim 8 in which the countersink in the pressure washer is about seventy-five degrees included angle and the head of the retaining screw is formed with an included angle of about eighty-two degrees.

10. An improved box joint as in claim 9 in which the pressure washer is formed with a clearance hole at least one thirty second of an inch larger than the shank of the securing screw.

11. An improved box joint as in claim 8 in which the screw is characterized as a flat headed screw and as a means for rotation has an engaging means for turning by a tool having compatible means.

12. An improved box joint as in claim 11 in which the means for rotation is a slot.

13. An improved box joint as in claim 10 in which the means for rotation is a socket formed in the screw head.

14. An improved box joint as in claim 11 in which there is additionally provided a substantially thin incompressible washer formed as a cone with the inner and outer surfaces adapted for mounting under the head of the screw and for contiguous engagement with the head and countersink so as to reduce friction in the turning adjustment of the cap screw.

15. An improved box joint as in claim 1 in which the pivot pin bushing and retaining screw are of stainless steel.

16. An improved box joint as in claim 1 in which the pivot pin bushing is of brass or bronze and has a through hole.

17. An improved box joint for pliers and the like in which the jaw portions are pivotally retained and movable in a prescribed plane normal to a pivot pin, this box joint including:
  (a) a first jaw member that is characterized as having a central tongue portion with outwardly facing surfaces smoothly finished and parallel to the plane of movement;
  (b) a second jaw member with substantially like portions providing first and second outer members and forming the outer sides of a box-like aperture in said second jaw member and with the facing inner surfaces of the aperture finished, and in the assembled condition the outer facing surfaces of the central tongue portion of the first jaw member are in a sliding relationship with the facing inner aperture surfaces of the first and second outer members of the second jaw member;
  (c) a counterbore and a through bore both having a predetermined axis formed in said first outer member of the second jaw and with said counterbore and through bore transverse of the plane of movement of the jaw members;
  (d) a through bore formed in and through the central tongue portion of the first jaw member, said through bore in axial coincidence with said through bore in the first outer member of the second jaw member;
  (d) a pivot pin bushing having a first diameter adapted to be seated in the counterbore of the first outer member and a second reduced outer diameter shank portion sized to be a tight fit in the remaining through bore of this first outer member of the second jaw member and with said shank portion of said bushing entering into said through bore in the portion of the first jaw and providing a pivot for said first jaw member, said pivot pin bushing having an axially threaded bore and in an installed condition is short the inner surface of the second outer member;
  (f) a first counterbore formed in the second outer member of the outer surface of the second member of the second jaw, and a second smaller diameter bore in axial coincidence with this first counterbore and extending through the remainder of the thickness of the second outer member, this counterbore extending toward the central tongue portion sufficiently to establish a thin flexure portion of about one thirty-second of an inch in thickness and sufficiently deflectable for this flexure portion to be moved for tightening the box joint, said second small diameter bore greater in diameter than the through bore sized to receive the pivot pin bushing, said second smaller bore continued into the top surface portion of the central tongue portion of the first jaw member to form a recess, the second smaller bore in the top surface of the central tongue portion of a shallow depth;
  (g) a washer of plastic such as Teflon, Nylon and the like and having anti-friction and cold flow properties, said washer having an outer diameter disposed to enter and be seated in said first counterbore in the second member of the second jaw member, said washer having an inner bore slightly larger than the threaded portion of the pivot pin bushing and with said washer having a thickness about the equivalent of the thin flexure portion, the washer adapted for mounting in said first counterbore before further assembly, and
  (h) a securing screw having a head adapted to seat and move the second outer member flexure portion toward the central tongue, said screw having a shoulder portion immediately below the head and about the thickness of the washer and of a diameter substantially equal to the outer diameter of the pivot pin bushing, the shank and shoulder of the screw in coincidence with the axis of the pivot pin bushing, the thread portion of said securing screw entering into the threaded portion of the pivot pin bushing and with tightening of the screw brings the box joint members into the desired sliding relationship of one to another, this adjustment reducing and/or eliminating any developed and unwanted play of and in the joint, the tightening of the screw causing a cold flow of the washer so as to surround the shoulder portion of the screw and to flow into the second smaller diameter bore in the thin flexure portion and into the shallow recess in the top surface of the tongue portion of the first jaw member, the washer thereby providing an anti-friction bearing.

18. An improved box joint as in claim 17 in which the washer under the head of the securing screw is of Teflon and with cold flow said washer is displaced to a position in which those surfaces parallel to the axis of the pivot pin bushing provide a low friction bearing means and in the laterally disposed extent normal to the surfaces parallel to the axis said washer provides anti-friction bearing means between the undersurface of the securing screw head and the flexure portion of the jaw.

19. An improved box joint as in claim 18 in which the washer is first made as a flat member.

20. An improved box joint as in claim 19 in which the inner bore of the washer is a slip fit on the threaded shank of the securing screw.

* * * * *